Apr. 24, 1923.

V. LINK 1,453,050

BRAKING MECHANISM

Filed Oct. 28, 1921

INVENTOR
VINCENT LINK
BY
William MacGlashan
ATTORNEY

Patented Apr. 24, 1923.

1,453,050

UNITED STATES PATENT OFFICE.

VINCENT LINK, OF DETROIT, MICHIGAN, ASSIGNOR TO STUDEBAKER CORPORATION, A CORPORATION OF NEW JERSEY.

BRAKING MECHANISM.

Application filed October 28, 1921. Serial No. 511,050.

*To all whom it may concern:*

Be it known that I, VINCENT LINK, a citizen of the United States of America, and resident of Detroit, in the county of Wayne and State of Michigan, have invented certain new and useful Improvements in Braking Mechanism, of which the following is a specification.

My invention relates to improvements in braking devices for automobiles in which both internal and external brakes are used in connection with the driving members, and the object of my invention is to provide a single bracket for both brake shafts, which will provide for supplying grease to the same over an extended period of time with one filling, and which will allow a unit assembly of the brake shaft bracket, brake shafts, brake anchorage, co-acting levers and the internal brake expanding cam, with all the inherent advantages connected therewith.

Brake shafts are usually placed in such an inaccessible position on an automobile that the greasing of their bearings causes a great deal of inconvenience and as a result the proper amount of lubricant is seldom supplied. This results in a worn, sticky, rattling or squeaky bearing which detracts from the suitable performance of the automobile of which it is a part. One object of my invention is to provide a magazine for the lubrication of these bearings so that when once filled it will last for a relatively long period of time and will not necessitate the inconvenience relative to lubricating the same nearly as often as has heretofore been the practice. It is also generally the case that each brake shaft with its co-acting levers, etc., is assembled separately to the rear axle unit, making it necessary for a person to have the entire axle unit before him in order to assemble the brake shaft, bracket, levers and cams in their proper place. The handling of such a large unit necessarily takes more time than handling a small unit, and another object of my invention is to provide a means whereby brake shafts, brake shaft bracket, brake anchorage, levers and cam, may be assembled as a unit and fastened to the brake support as a unit. Another advantage of this device is that it allows more accurate fits, and cuts down the time of assembling inasmuch as the unit itself is small and can therefore be handled as what is known as a bench assembly.

My invention consists of a bracket, so constructed as to form a relatively large magazine for grease and allowing the assembly therewith of divers braking mechanism, such as the brake shafts, brackeshaft levers, internal brake expanding cam, etc., the assembly to be fastened as a unit to the rear axle unit. The bracket forms a support and bearing for both brake shafts and has a relatively large passage cored around each shaft and united with each other for holding grease which is supplied through a single opening.

In order to more clearly describe my invention, I will refer to the accompanying drawing which illustrates an embodiment of my present invention.

In the accompanying drawings—

Figure 1:
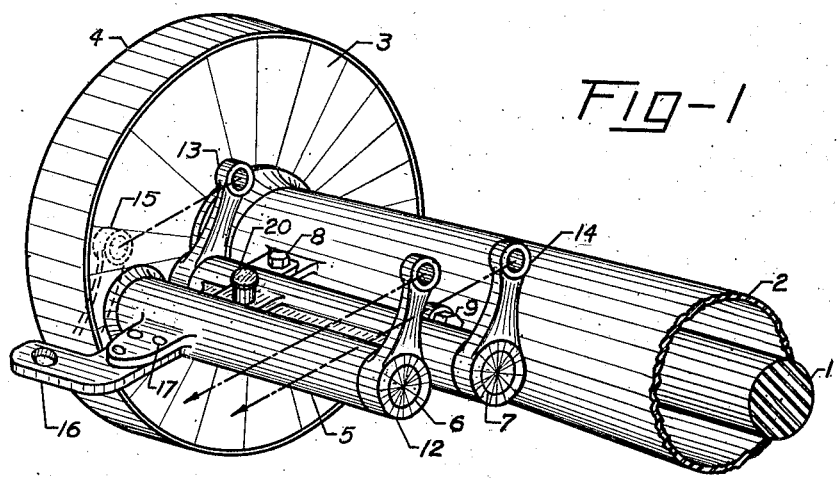
Figure 1 is a fragmentary perspective view of a rear axle of an automobile to which a brake shaft bracket embodying my present invention is shown attached.
Figure 2:
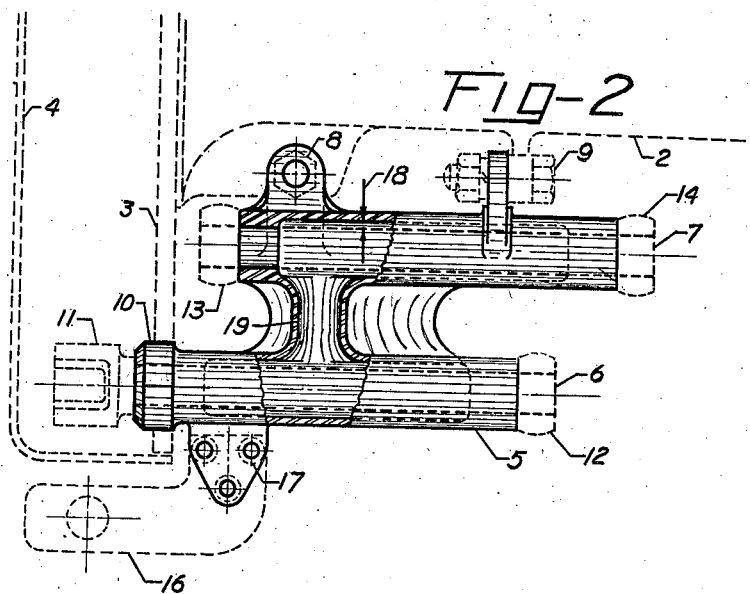
Figure 2 is a partially broken plan view of the brake shaft bracket illustrated in Figure 1 with the accompanying parts shown with dotted lines to better illustrate its adaption.

1 is a live axle; 2 is an axle housing, 3 is a brake support; 4 is a brake drum fastened to a wheel not shown; 5 is a brake shaft bracket embodying my present invention and having the shafts 6 and 7 journaled therein, and held in position by the bolts 8 and 9 and the enlarged end 10 of the bracket 5 which fits into the brake support 3 as clearly shown in Figure 2. The brake shaft 6 has a cam 11 on one end which is used to operate the internal expanding brake, not shown, in the conventional way. The brake shaft 6 and cam 11 are moved by the lever 12 which is securely fastened in the position shown and which is operated by the driver of the car thru suitable mechanism. The brake shaft 7 has the levers 13 and 14 securely fastened in the position shown, the lever 13 being connected by a link to the lever 15 of any conventional brake mechanism operating the external contracting brake which is not shown. These parts are moved by the lever 14 which is operated by the driver of the car thru suitable mechanism. 16 is an anchorage for the external braking mechanism and is fastened to the bracket 5 by suitable means such as rivets, bolts, or the like as shown at 17. The brake shafts 6 and 7 are journaled in the bracket 5 only at the ends as shown, the space intervening being cored out of larger diameter than the shafts, allowing a space as shown by the arrows 18 between the walls of the bracket and the shafts. A cored passage as shown at 19 connects the spaces around each of the shafts. Lubricant introduced into the passage 19 thru any suitable cup or filling device as at 20 passes to the space around each shaft, thereby lubricating the shaft bearings. The passage 19 and the spaces as shown at 18 are left relatively large so that a comparatively large amount of lubricant may be introduced at one time, thereby eliminating the necessity of frequent applications of lubricant as is now common practice. These parts being small, form an easily handled and quickly assembled unit which is applied to the rear axle unit by introducing the end 10, which is made purposely larger in diameter than the cam 11, into the brake support 3 as shown, and by bolting the bracket 5 to the rear axle housing 2 as shown at 8 and 9.

Formal changes may be made in the specific embodiment of the invention described without departing from the spirit or substance of the broad invention, the scope of which is commensurate with the appened claims.

What I claim is:—

1. In combination with the rear axle of an automobile and associated braking mechanism including a brake support, a unit assemblage of brake operating mechanism having a relatively large lubricating magazine incorporated therewith and having one end of the unit socketed in the brake support and passing therethru.

2. The combination with the axle of an automobile and the braking mechanism connected therewith, of a bracket capable of receiving and journaling brake shafts, capapable of receiving and containing relatively large amounts of lubricant for the brake shaft bearings and allowing the assembly therewith of parts related thereto, and means for attaching the assembly in place as a unit.

3. The combination with the axle of an automobile and associated braking mechanism, of a unit assemblage of brake operating mechanism including shafts, a brake drum, an internal brake expanding cam and a base incorporating a lubricating magazine of relatively large capacity to lubricate said shafts of the said unit assemblage journaled therein, and means to secure said brake operating mechanism as a unit in operative position without removing said brake drum.

4. In combination with the axle of an automobile having a brake support and braking mechanism connected therewith, a unit assemblage of brake operating mechanism incorporating an integral lubricating magazine of relatively large capacity, being retained as a unit in operative position by one end passing thru the said brake support.

5. In combination with the axle of an automobile and association braking mechanism, a bracket, having an enlarged end and incorporating a lubricating magazine of relatively large capacity, supporting a unit assemblage of brake operating mechanism including an internal brake cam, and a brake support having an opening to permit the passage of said cam therethru of such a diameter as to fit said enlarged end of said bracket supporting said unit assembly.

6. The combination with the axle of an automobile and the braking mechanism connected therewith, of a bracket capable of receiving and journaling brake shafts, capable of receiving and containing relatively large amounts of lubricant introduced at a single point for the lubrication of the brake shaft bearings, and allowing the assembly therewith of parts relating thereto, and means for attaching the assembly in place as a unit.

7. The combination with the rear axle of an automobile and the braking mechanism therefor consisting of internal and external brakes and actuating devices, of a brake shaft bracket capable of receiving and supporting the brake shafts, capable of containing a relatively large amount of lubricant for the lubrication of the brake shaft bearings and allowing an assembly therewith of the brake shifts, brake shaft levers and internal brake expanding cam, the assembly capable of being attached to the rear axle as a unit.

8. The combination with the rear axle of an automobile and the braking mechanism therefor consisting of a brake drum, an external contracting brake, an internal expanding brake, contracting linkage for the external brake, a cam for expanding the internal brake, brake shafts and brake shaft levers; of a brake shaft bracket capable of receiving and journaling said brake shafts, capable of receiving and containing a relatively large amount of lubricant for the lubrication of the brake shaft bearings and allowing an assembly therewith of the brake shafts, brake shaft levers and internal expanding cam, the assembly capable of being attached in place as a unit.

Signed by me at Detroit, Michigan, U. S. A., this 26th day of October 1921.

VINCENT LINK.

Witnesses:
 ELMER L. McINTYRE,
 HODGSON S. PIERCE.